(12) United States Patent
Shimizu et al.

(10) Patent No.: US 6,187,888 B1
(45) Date of Patent: Feb. 13, 2001

(54) CAST MOLDING MATERIAL FOR PLASTIC LENS AND PROCESS FOR THE PRODUCTION OF PLASTIC LENS

(75) Inventors: Akiko Shimizu; Yukio Kageyama; Shigeo Nakamura, all of Tokyo (JP)

(73) Assignee: Hoya Corporation

( * ) Notice: Under 35 U.S.C. 154(b), the term of this patent shall be extended for 0 days.

(21) Appl. No.: 09/401,525

(22) Filed: Sep. 22, 1999

Related U.S. Application Data

(62) Division of application No. 08/951,052, filed on Oct. 16, 1997, now Pat. No. 6,056,900.

(30) Foreign Application Priority Data

Sep. 17, 1997 (JP) .................................................. 9-252225

(51) Int. Cl.$^7$ ...................................................... C08F 18/24
(52) U.S. Cl. ............................ 526/314; 264/1.1; 264/2.3; 264/2.6; 264/334; 425/808; 526/194; 526/209; 526/319; 526/344
(58) Field of Search ................................... 526/194, 209, 526/314, 319, 344; 264/1.1, 2.3, 2.6, 334; 425/808

(56) References Cited

U.S. PATENT DOCUMENTS

| | | | |
|---|---|---|---|
| 3,872,042 | * | 3/1975 | Bond ..................... 264/2.3 |
| 3,944,637 | * | 3/1976 | Bond et al. ............. 264/2.3 |
| 4,146,696 | * | 3/1979 | Bond et al. ............. 264/2.3 |
| 4,547,397 | * | 10/1985 | Burzynski et al. . |
| 5,712,229 | * | 1/1998 | Hopkins et al. . |
| 5,725,960 | * | 3/1998 | Konishi et al. . |
| 5,880,170 | * | 3/1999 | Imura et al. ........... 522/104 |
| 5,917,119 | * | 6/1999 | Yamakaji et al. ...... 364/526 |

* cited by examiner

Primary Examiner—John M. Cooney, Jr.
(74) Attorney, Agent, or Firm—Burns, Doane, Swecker & Mathis, L.L.P.

(57) ABSTRACT

A cast-molding material for a plastic lens which is almost free from causing defective dyeing when dyed, and a process for producing plastic lenses almost free from causing defective dyeing, the cast-molding material containing, as essential components, a combination of (A) diethylene glycol bisallylcarbonate or a mixture of diethylene glycol bisallylcarbonate and a monomer copolymerizable therewith, with (B) a polyether-modified silicone compound, and the process comprising cast-molding the above cast-molding material in a mold.

5 Claims, 1 Drawing Sheet

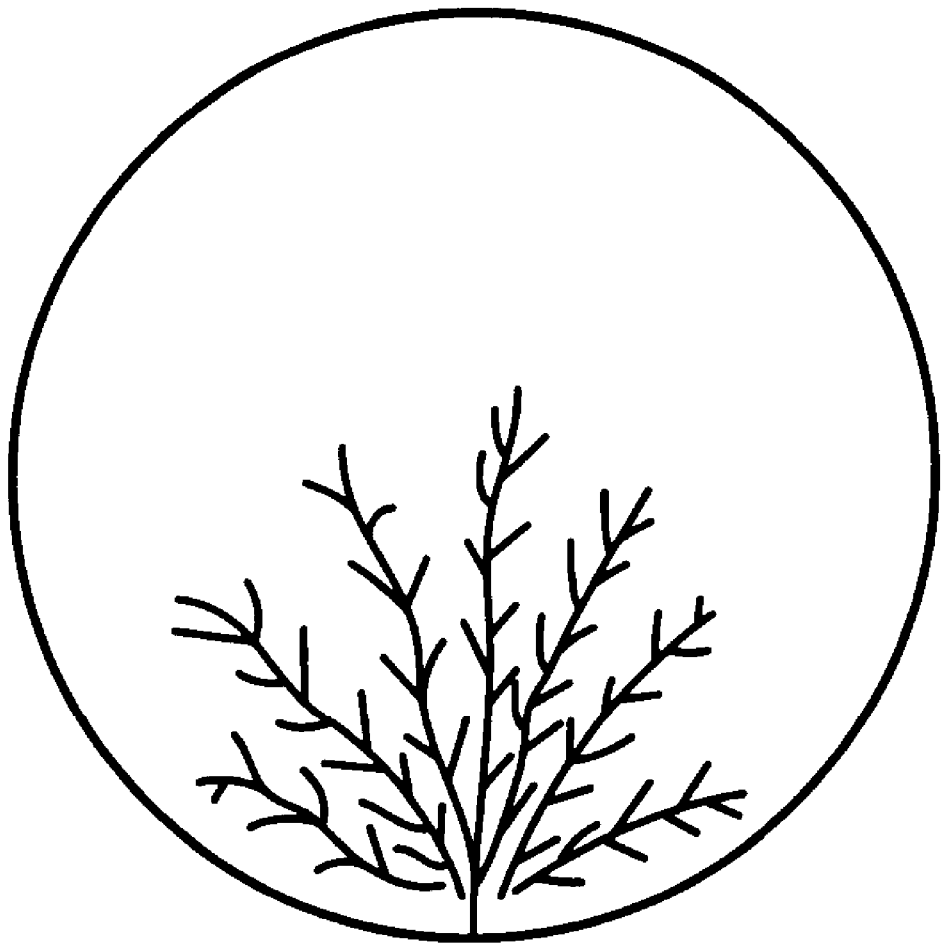
Figure

CAST MOLDING MATERIAL FOR PLASTIC LENS AND PROCESS FOR THE PRODUCTION OF PLASTIC LENS

This application is a divisional of application No. 08/951,052, filed Oct. 16, 1997, now U.S. Pat. No. 6,056,900.

1. Field of the Invention

The present invention relates to a cast-molding material for a plastic lens and a process for the production of a plastic lens. More specifically, it relates to a cast-molding material for a plastic lens which is free from causing defective dyeing when dyed, and a process for producing plastic lenses from the material at high yields.

2. Prior Art

Plastic lenses obtained by cast-molding diethylene glycol bisallylcarbonate (called "DAC" for short hereinafter) have been and are widely used as various optical lenses such as ophthalmic lenses. That is because lenses formed of DAC resin have remarkably excellent performances, e.g., that they have a light weight and are not easily breakable as compared with glass, and that they can be dyed.

The cast-molding of DAC generally uses a mold formed of glass, gaskets of a resin and an adhesive tape, and it is known that the cast-molding also uses a mold releasing agent, e.g., Zelec UN(trade name, supplied by E. I. du Pont de Nemours & Co.) or butyl stearate (data to "HIRI CASTING RESIN", issued by PPG, 1996). The effect of the use of the mold releasing agent is that the releasability of lenses from a mold is improved so that an improvement in workability and the prevention of breaking of lenses are attained.

When lenses are produced from DAC resin, however, lenses having some forms incur an undesirable outcome of a distinctive non-uniformity of dyeing when dyed, as shown in FIG. 1. This phenomenon is outstanding in plus power number (including 0.00 diopter (D)) lenses having a meniscus form and having a smaller radius of curvature of a convex surface than the radius of curvature of a concave surface. The above defect is found only after lenses are dyed, and it is therefore a major factor for decreasing the acceptance ratio of lenses in the step of dyeing.

For overcoming the above problem, the present inventors have made diligent studies and have arrived at the present invention by finding the following. A material containing, as essential components, a combination of either DAC or a mixture of DAC and a monomer copolymerizable therewith with a specific silicone compound can overcome the above problem, and plastic lenses almost free from causing defective dyeing can be obtained at high yields by cast-molding the above material in a mold.

SUMMARY OF THE INVENTION

It is therefore an object of the present invention to provide a cast-molding material for a plastic lens which is almost free from causing defective dyeing when dyed, and a process for producing plastic lenses almost free from causing defective dyeing at high yields.

According to the present invention, there is provided a cast-molding material containing, as essential components, a combination of (A) DAC or a mixture of DAC and a monomer copolymerizable therewith, with (B) a polyether-modified silicone compound.

Further, according to the present invention, there is provided a process for the production of a plastic lens, which comprises cast-molding the above cast-molding material in a mold.

Further, in a preferred embodiment of the process of the present invention, a cast-molding material containing the above component (A) and 0.1 to 10,000 ppm by weight, based on the component (A), of the component (B) is cast-molded in a mold, or the interior surface of a mold is pre-treated by coating it with the component (B) and then the component (A) is cast-molded in the mold.

BRIEF DESCRIPTION OF DRAWING

FIG. 1 schematically shows the form of non-uniformity of dyeing.

DETAILED DESCRIPTION OF THE INVENTION

For the cast-molding material of the present invention, DAC or a mixture of DAC and a monomer copolymerizable therewith is used as component (A). The above copolymerizable monomer includes monomers conventionally used together with DAC for producing plastic lenses, e.g., compounds having at least one polymerizable double bond such as a vinyl group, an acryl group, a methacryl group or an allyl group. For example, the above copolymerizable monomer is selected from vinyl compounds such as vinyl chloride, vinyl fluoride, vinylidene chloride, vinylidene fluoride, vinyl acetate, vinyl phenylacetate, vinyl benzoate, vinylnaphthalene, vinyl α-naphthoate and vinyl β-naphthoate, styrene derivatives such as styrene, a-methylstyrene and p-chlorostyrene, acrylates such as methyl acrylate, ethyl acrylate, 2,2,2-trifluoroethyl acrylate, benzyl acrylate, phenyl acrylate and naphthyl acrylate, methacrylates such as methyl methacrylate, ethyl methacrylate, 2,2,2-trifluoroethyl methacrylate, benzyl methacrylate, phenyl methacrylate and naphthyl methacrylate, allyl compounds such as acrylonitrile, methacrylonitrile, allyl benzoate and phenyl allyl ether, and, further, compounds having a polymerizable double bond such as butadiene, 1,5-hexadiene, vinyl acrylate, vinyl methacrylate, divinyl phthalate, divinyl isophthalate, divinylbeznene, diallyl phthalate, diallyl isophthalate, allyl acrylate, allyl methacrylate, β-methacryl methacrylate, methacrylic anhydride, diethylene glycol bisallyl ether, tetraethylene glycol dimethacrylate, bisphenol A dimethacrylate, triallyl trimellitate, triallyl phosphate, triallyl phosphite, diphenyldiallylsilane and diphenyldivinylsilane. The above monomers may be used alone or in combination. Further, the amount of the copolymerizable monomer is preferably 50% by weight or less based on the total amount of the monomers used.

The cast-molding material of the present invention contains a polyether-modified silicone compound (dyeing-nonuniformity preventer) as component (B) for preventing the non-uniformity of dyeing when a lens formed of the cast-molding material is dyed.

The above polyether-modified silicone compound includes compounds of the formula (I),

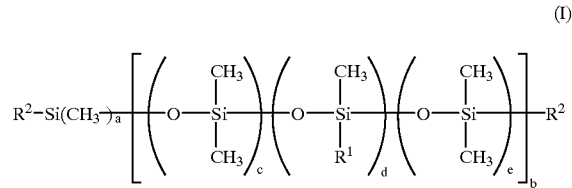

(I)

wherein:
a is an integer of 0 to 2,
b is an integer of 1 to 3,
provided that a+b=3,
each of c, d and e is an integer of 0 to 500,
provided that c+d+e=an integer of 5 to 1,000,
$R^1$ is —$(CH_2)_l(OC_2H_4)_m(OC_3H_6)_nOR^3$, and
$R^2$ is methyl or —$(CH_2)_l(OC_2H_4)_m(OC_3H_6)_nOR^3$,
in which $R^3$ is a hydrogen atom or a hydrocarbon group having 1 to 8 carbon atoms, and
each of l, m and n is an integer of 0 to 500,
provided that m+n=an integer of 1 to 1,000.

In the above formula (I), the hydrocarbon group having 1 to 8 carbon atoms in the definition of $R^3$ is a linear, branched or cyclic alkyl group having 1 to 8 carbon atoms, an aryl group having 6 to 8 carbon atoms or an aralkyl group having 7 or 8 carbon atoms. Specific examples of the above hydrocarbon group include methyl, ethyl, n-propyl, isopropyl, n-butyl, isobutyl, sec-butyl, tert-butyl, pentyl, hexyl, heptyl, octyl, cyclopentyl, cyclohexyl, phenyl, tolyl, benzyl and phenetyl.

In the present invention, in view of an effect, preferably, the polyether-modified silicone compound as component (B) has a molecular weight of 200 to 100,000, and an aqueous solution containing 1% by weight of the polyether-modified silicone compound has a surface tension of 10 to 50 dyn/cm.

The above polyether-modified silicone compound is commercially easily available as polyether-modified silicone surfactants such as L-7602, L-7604, FZ-2165, FZ-2163, FZ-2191, FZ-2105, FZ-2161 and SILWET408 (these are all trade names; supplied by Nippon Unicar K.K.), TSF4440, TSF4445, TSF4446, TSF4450, TSF4452 and TSF4460 (trade names, supplied by Toshiba Silicone K.K.), or KF-351, KF-355 and KF-618 (trade names; supplied by The Shin-Etsu Chemical Co., Ltd.). Of the above surfactants, L-7604 is preferred since it produces the highest effect, requires no large amount in use and has no adverse effect on other properties.

In the present invention, as component (B), the above silicone-modified compounds may be used alone or in combination. Incidentally, compounds which are not modified with a polyether, such as an unmodified compound of the formula (II),

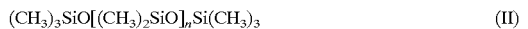

$(CH_3)_3SiO[(CH_3)_2SiO]_nSi(CH_3)_3$ (II)

have almost no effect on the prevention of the non-uniformity of dyeing.

The cast-molding material of the present invention contains a combination of the above components (A) and (B) as essential components, while it may further contain various known additives such as an ultraviolet absorbent, a photo-stabilizer and an antioxidant as required in combination with the above essential components.

The cast-molding material of the present invention, as its one embodiment, is a composition prepared by homogeneously mixing the polyether-modified silicone compound as component (B) and optional additives with the above component (A). In this case, the amount of the component (B) is set in the range of from 0.1 to 10,000 ppm by weight based on the component (A). When the amount of the component (B) is less than 0.1 ppm by weight, the component (B) may not sufficiently produce the effect on the prevention of non-uniformity of dyeing. When the above amount exceeds 10,000 ppm by weight, the transparency of a lens is impaired in some cases. For effectively preventing the non-uniformity of dyeing and avoiding a decrease in the transparency of a lens, the amount of the component (B) is preferably 0.5 to 1,000 ppm by weight, particularly preferably 1 to 100 ppm by weight.

The process for the production of a plastic lens, provided by the present invention, will be explained hereinafter.

In the process for the production of a plastic lens, provided by the present invention, a plastic lens is produced by cast-molding the above cast-molding material in a casting mold. For the production, the following two methods can be employed. That is, a plastic lens is produced by any one of a method (1) in which the component (B) in an amount, based on the component (A), of 0.1 to 10,000 ppm by weight, preferably 0.5 to 1,000 ppm by weight, more preferably 1 to 100 ppm by weight, is mixed with the component (A), various additives are added as required, and the resultant cast-molding material is cast-molded in a mold, and a method (2) in which the interior surface of a mold is treated by coating it with the component (B) in advance and the component (A) containing various optional additives as required is cast-molded in the mold.

The above cast-molding may use a radical polymerization initiator as required. The radical polymerization initiator is selected from those initiators which are used for conventional DAC polymerization, such as organic peroxide-containing polymerization initiators and azo-containing polymerization initiators. Specific examples of the above radical polymerization initiator include benzoyl peroxide, di-tert-butyl peroxide, diisopropyl peroxycarbonate, di-sec-butyl peroxydicarbonate, tert-butyl peroxypivalate, 2,2'-azobisisobutyronitrile, 2,2'-azobis-2-methylbutyronitrile, isobutyl peroxide, bis(neodecanoylperoxy) diisopropylbenzene, dipropyl peroxydicarbonate, cumyl peroxyneodecanoate, tetramethylbutyl peroxyneodecanoate, bis(butylcyclohexyl) peroxydicarbonate, cyclohexylmethyl peroxyneodecanoate, diethoxyethyl peroxydicarbonate, diethylhexyl peroxydicarbonate, hexyl peroxydecanoate, dimethoxybutyl peroxydicarbonate, dimethylmethoxybutyl peroxydicarbonate, butyl peroxyneodecanoate, dichloroben-zoyl peroxide, hexyl peroxypivalate, butyl peroxypivalate, trimethylhexanoyl peroxide, octanoyl peroxide, lauroyl preoxide, stearoyl peroxide, tetramethylbutyl peroxyethylhexanoate, succinic peroxide, dimethyldiethyl-hexanoyl peroxyhexane, cyclohexylmethylethyl peroxyethylhexanoate and hexyl peroxyethylhexanoate.

The above method (1) will be specifically explained. A molding material containing the above component (A), the above component (B) and optionally the radical polymerization initiator and the various additives is cast into a cavity formed of a cleaned mold and gaskets and polymerized in an electric furnace, or the like, with controlling temperature.

Concerning polymerization conditions, preferably, the molding material is maintained at a temperature of approximately 20 to 50° C. for 1 to 10 hours at the initial stage of the polymerization, and then the molding material is temperature-increased up to approximately 70 to 100° C. over the period of 6 to 60 hours to complete the polymerization. When the initial temperature of the polymerization is lower than 20° C., impractically, the polymerization time is unnecessarily long. When it is higher than 50° C., it is difficult to control the polymerization, and there is liable to be obtained an optically non-uniform lens. Further, when the final temperature is lower than 70° C., unreacted monomer is liable to remain, and there may be obtained a lens having decreased physical properties. When it is higher than 100° C., the mold and a lens are liable to be separated from each other during the polymerization, which causes the yield of lenses to decrease.

After the completion of the above polymerization, the gaskets are removed, and a lens is peeled from the mold, for example, by inserting or driving a wedge-shaped jig formed of a resin or a metal between the mold and the lens under pressure. Further, the mold and the lens can be separated from each other on the basis of temperature difference caused by immersing the mold and the lens, which are integrated by the molding, in a cooled solvent or water. Generally, a non-polymerized substance adheres to the so-separated lens, and therefore, the lens may be cleaned with a proper solvent such as trichloroethylene or a warm cleaning liquid as required.

On the other hand, in the above method (2), the polyether-modified silicone compound as component (B) is applied to the cleaned interior surface of a mold, and then a molding material containing the above component (A) and optionally the radical polymerization initiator and the various additives is cast into a cavity formed of the mold and gaskets and polymerized in the same manner as in the above method (1). Then, a lens is obtained by separating it as above, and cleaning it as required, in the same manner.

The method of application of the polyether-modified silicone compound is not specially limited. For example, the application can be carried out by dissolving the polyether-modified silicone compound in a proper solvent such as a lower alcohol to prepare a coating liquid, applying the coating liquid to the interior wall of a mold by a generally employed method such as an immersion method, a spraying method or a brushing method, and then drying the applied liquid.

A plastic lens obtained by the above process is almost free from causing non-uniformity of dyeing when dyed, and gives a high acceptance ratio at the step of dyeing. For improving the above plastic lens in scratch resistance, further, a hard coating layer may be formed thereon by a known method regardless of whether or not it is dyed. Further, for the prevention of reflection, a reflection-preventing coating layer may be formed by vacuum deposition or sputtering. The hard coating layer will be explained in detail later.

For decreasing the non-uniformity of dyeing, there is known a method of extremely increasing or decreasing the amount of a polymerization initiator as compared with a usual amount thereof. However, a lens obtained by the above method can be no longer referred to as a so-called DAC resin lens in view of its physical properties.

The process of the present invention can effectively prevent the non-uniformity of dyeing when a lens is dyed, and it is therefore preferred to apply the process of the present invention to the production of a plastic lens to be dyed. Further, when the process of the present invention is applied to the production of a plastic lens having a plus lens power number (power number of at least 0.00 D), advantageously, the effect of the present invention is effectively exhibited.

The above lens power number (D) refers to
D=n−1/R (n=refractive index and R=radius of curvature).
The method of dying an obtained lens will be explained.
As a dye, a disperse dye and a cationic dye are preferred, and a disperse dye is particularly preferred. Dyeing conditions such as a dyeing concentration, a dyeing temperature and an immersing time may be varied in broad ranges. In view of light shielding capability and reproducibility of dyeing, preferably, the dyeing concentration of the dye based on 1 liter of water is 0.01 to 5 wt %, the immersing time is 10 minutes to 6 hours, more preferably 20 minutes to 3 hours, and the dyeing temperature is 60 to 100° C., more preferably 80 to 90° C.

When the lens is dyed by the above method, the lens is dyed without causing non-uniformity of dyeing. The dyeing without causing non-uniformity of dyeing is effective for an ophthalmic lens having a meniscus form, and in particular, it is greatly effective for a plastic lens having a smaller radius of curvature of a convex surface than the radius of curvature of a concave surface. Further, with an increase in a difference in radii of curvature, i.e., a deviation, the effect increases. Further, it is more effective for a lens of which the convex surface has the form of a non-spherical surface than it is for a lens having the form of a spherical surface, regardless of whether it has a single focal point or multi-focal points.

The hard coating layer will be explained hereinafter.

The plastic lens obtained from the cast-molding material provided by the present invention can give a lens having more excellent abrasion resistance by forming thereon a hard coating layer containing an organosilicon polymer The above hard coating layer containing an organosilicon polymer can be formed by forming a layer of a compound selected from the class consisting of compound groups of the following formula and/or hydrolyzates thereof on a lens substrate by a dipping method or an application method and curing the layer.

$$(R^4)_f(R^5)_g Si(OR^6)_{4-(f+g)} \quad (III)$$

wherein each of $R^4$ and $R^5$ is an alkyl group, an aryl group, a halogenated alkyl group, a halogenated aryl group, an alkenyl group or an organic group which has an epoxy group, a (meth)acryloxy group, a mercapto group or a cyano group and is to be bonded to a silicon atom by an Si-C bond, $R^6$ is an alkyl group, an alkoxyalkyl group or an acyl group, and each of f and g is 0, 1 or 2 provided that f+g=1 or 2.

Examples of the above organosilicon compounds include trialkoxy or triacyloxysilanes such as methyltrimethoxysilane, methyltriethoxysilane, methyltrimethylethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltriacetoxysilane, vinyltrimethoxysilane, phenyltrimethoxysilane, phenytriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropyltriethoxysilane, γ-(β-glycidoxyethoxy)propyltrimethoxysilane, β-(3,4-epoxycyclohexyl)ethyltrimethoxysilane, β-(3,4-epoxycyclohexyl)ethyltriethoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β(aminoethyl)-γ-aminopropyltrimethoxysilane and β-cyanoethyltriethoxysilane, and dialkoxysilanes or dialkyloxysilanes such as dimethyldimethoxysilane, phenylmethyldimethoxysilane, dimethyldiethoxysilane, phenylmethyldiethoxysilane, γ-glycidoxypropylmethyldimethoxysilane, γ-glycidoxypropylmethyldiethoxysilane, γ-glycidoxypropylphenyldimethoxysilane, γ-glycidoxypropylphenylethoxysilane,
γ-chloropropylmethyldimethoxysilane,
γ-chloropropylmethyldiethoxysilane,
dimethyldiacetoxysilane,
γ-methacryloxypropylmethyldimethoxysilane,
γ-methacryloxypropylmethyldiethoxysilane,
γ-mercaptopropylmethyldimethoxysilane,
γ-mercaptopropylmethyldiethoxysilane,
γ-aminopropylmethyldimethoxysilane,
γ-aminopropylmethyldiethoxysilane, methylvinyldimethoxysilane and methylvinylethoxysilane. The above organosilicon compounds may be used alone or in combination.

Further, although not used alone, various tetraalkoxysilanes or hydrolyzates thereof may be used in combination with the above organosilicon compound. Examples of these tetraalkoxysilanes include methyl silicate, ethyl silicate, n-propyl silicate, isopropyl silicate, n-butyl silicate, sec-butyl silicate and tert-butyl silicate.

The above organosilicon compound cab be cured in the absence of a catalyst, while various catalysts may be used for further promoting the curing.

The above catalyst is selected from a Lewis acid, various acids or bases containing a Lewis acid, or metal salts of an organic carboxylic acid, chromic acid, hypochlorous acid, boric acid, bromic acid, selenious acid, thionitric acid, orthosilicic acid, thiocyanic acid, nitrous acid, aluminic acid and carbonic acid, particularly, alkali metals salts or ammonium salts thereof, and further, it can be selected from alkoxides of aluminum, zirconium or titanium or complex compounds of these.

Further, the above organosilicon compound may be used in combination with other organic substance such as an epoxy resin, an acryl-based copolymer or a hydroxyl-group-containing polymer such as polyvinyl alcohol.

Further, as other shaping component, there may be used a colloid sol of inorganic oxide of Si, Al, Ti or Sb as disclosed in Optica Acta(page 251, issued in July 1962). Moreover, for easing the coating operation, solvents for maintaining the storage in an excellent state and various additives may be used.

A composition which is preferred for coating a plastic lens contains a high concentration of water-dispersed colloidal silica, a trifunctional oranosilicon compound which is curable after hydrolysis and has the following formula,

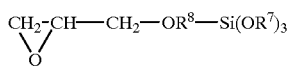
(IV)

wherein $R^7$ is an alkyl group having 1 to 4 carbon atoms and $R^8$ is an alkylene group having 1 to 4 carbon atoms, and a curing agent. In the above composition, the amount of silica based on the total amount of the colloidal silica (as $SiO_2$ solid content) and the organosilicon compound is 75 to 95 mol %, and the amount of the organosilicon compound is preferably 25 to 5 mol %. Further, the above composition preferably contains an organic acid and a solvent, and when a plurality of organic acids are contained, at least one of the organic acid is preferably cellosolve of the formula, $$R^9—O—CH_2CH_2—OH \qquad (V)$$

wherein $R^9$ is an alkyl group having 1 to 4 carbon atoms. In the composition for coating a plastic lens, particularly preferably, the concentration of the colloidal silica is at least 40% by weight, the organic acid is acetic acid, and the amount of the acetic acid per mole of the total amount of the colloidal silica and the organosilicon compound is 5 to 30 g.

The above organosilicon-containing coating liquid containing colloidal silica shows strong adhesion to a plastic lens surface and imparts the plastic lens with abrasion resistance, durability, chemical resistance and heat resistance.

Further, the hard coating treatment may be carried out before or after the dyeing. When a composition containing the organosilicon compound of the above formula (IV) and the cellosolve of the above formula (V) is used, however, it is preferred to carry out the hard coating treatment after the dyeing.

It is not necessarily clear what causes the distinctive non-uniformity of dyeing found when a lens formed of DAC resin is dyed. Since, however, the form of the non-uniformity of dyeing is very similar to a discharge mark called "static mark" which occurs when static electricity is discharged, it is assumed that the following causes the distinctive non-uniformity of dyeing. When a mold and a lens are peeled off from each other after the polymerization, a stress caused by polymerization-induced contraction is instantaneously released, and as a result, static electricity occurs due to a friction between the mold and the lens and causes a discharge phenomenon. Further, the lens surface just after the lens is peeled from the mold is very active, and it is assumed that the active lens surface also promotes the partial alteration of the lens surface.

In the present invention, therefore, the polyether-modified silicone compound used as component (B) functions as follows to prevent the occurrence of non-uniformity of dyeing. That is, the above silicone compound has the capability of surface action since it is modified with a polyether. Therefore, the silicone compound incorporated into DAC alone or a monomer mixture containing DAC, or the silicone compound applied to the interior surface of a mold, prevents the friction between the mold and a lens as a first function thereby to prevent the occurrence of static electricity, and also decreases the surface activity of the lens as a second function thereby to prevent the alteration of the lens surface caused by static electricity. As a result, the occurrence of non-uniformity of dyeing is prevented.

EXAMPLES

The present invention will be explained more in detail with reference to Examples hereinafter, while the present invention shall not be limited by these Examples.

Example 1

A molding material containing 100 parts by weight of DAC, 3 parts by weight of diisopropyl peroxydicarbonate, 30 ppm by weight of "L-7604" (polyether-modified-silicone-based surfactant, molecular weight 4,000, surface tension of a 1 wt % aqueous solution 23.2 dyn/cm, supplied by Nippon Unicar K.K.) as a dyeing non-uniformity preventer and 0.03 part by weight of 2-hydroxy-4-n-octoxybenzophenone was cast into a mold formed of a glass mold and gaskets formed of polyethylene, and polymerized at 40° C. for 10 hours, at 50° C. for 5 hours, at 60° C. for 3 hours, 70° C. for 2 hours and then at 80° C. for 2 hours.

After the completion of the polymerization, the gaskets were removed, and lenses were released by inserting a wedge-shaped jig of a resin between the mold and the lenses under pressure and taken out. The lenses and the glass mold had no breaking. Further, the obtained lenses were dyed by the following method to show no non-uniformity of a color. Table 1 shows the composition of the molding material, and Table 2 shows the properties of the molding material and the lenses. The obtained lenses had a spherical surface and the power number thereof is +6.00 D.

(Method of dyeing)

35 Grams of a gray disperse dye (supplied by HOYA Corporation) and 14 g of a dyeing stabilizer (surfactant, supplied by HOYA Corporation) were added to 7 liters of deionized water at 80° C., and the mixture was stirred for several minutes to obtain a dyeing solution. Lenses were dyed with the dyeing solution under conditions of a dyeing temperature of 80° C. and a dyeing time of 10 minutes.

Example 2

Example 1 was repeated except that 30 ppm by weight of "L-7604" was replaced with 50 ppm by weight, based on DAC, of "L-7602" (polyether-modified-silicone-based surfactant, molecular weight 3,000, surface tension of a 1 wt % aqueous solution 22.8 dyn/cm, supplied by Nippon Unicar K.K.), that the production of the spherical plane lenses were changed to the production of non-spherical plane lenses and that the power number was changed to +5.00 D. Table 1 shows the composition of the molding material, and Table 2 shows the properties of the molding material and the lenses. As shown in Table 2, the obtained lenses had excellent properties.

Example 3

Lenses (power number +5.00 D) were produced from a molding material containing 100 parts by weight of DAC, 3 parts by weight of diisopropyl peroxydicarbonate, 20 ppm by weight, based on DAC, of L-7604 (the same as that used in Example 1), 20 ppm by weight, based on DAC, of L-7602 (the same as that used in Example 2) and 0.03 part by weight of 2-hydroxy-4-n-octoxybenzophenone in the same manner as in Example 1, and evaluated in the same manner as in Example 1. Table 1 shows the composition of the molding material, and Table 2 shows the properties of the molding material and the lenses. As shown in Table 2, the obtained lenses had excellent properties.

Example 4

Lenses were produced from a molding material containing 90 parts by weight of DAC, 10 parts by weight of methyl methacrylate, 2.5 parts by weight of diisopropyl peroxydicarbonate, 50 ppm by weight, based on the total amount of DAC and the methyl methacrylate, of L-7602 (the same as that used in Example 2) and 0.03 part by weight of 2-hydroxy-4-n-octoxybenzophenone in the same manner as in Example 1, and evaluated in the same manner as in Example 1. Table 1 shows the composition of the molding material, and Table 2 shows the properties of the molding material and the lenses. As shown in Table 2, the obtained lenses had excellent properties.

Example 5

Lenses (power number +4.00 D) were produced from a molding material containing 75 parts by weight of DAC, 25 parts by weight of diallyl terephthalate, 2.5 parts by weight of diisopropyl peroxydicarbonate, 100 ppm by weight, based on the total amount of DAC and the diallyl terephthalate, of FZ-2165 (polyether-modified-silicone-based surfactant, molecular weight 3,000, surface tension of 1 wt % aqueous solution 22.4 dyen/cm) and 0.03 part by weight of 2-hydroxy-4-n-octoxybenzophenone in the same manner as in Example 1, and evaluated in the same manner as in Example 1. Table 1 shows the composition of the molding material, and Table 2 shows the properties of the molding material and the lenses. As shown in Table 2, the obtained lenses had excellent properties.

Example 6

A mold was treated in advance by immersing it in a solution of 0.5 wt % of L-7602 (the same as that used in Example 2) in methanol, and a molding material containing 100 parts by weight of DAC, 3 parts by weight of diisopropyl peroxydicarbonate and 0.03 part by weight of 2-hydroxy-4-n-octoxybenzophenone was cast into the mold. Thereafter, the procedures in Example 1 were repeated except that lenses had a non-spherical plane and a power number of +4.00 D. Table 1 shows the composition of the molding material, and Table 2 shows the properties of the molding material and the lenses. As shown in Table 2, the obtained lenses had excellent properties.

Then, a hard coating liquid for forming a hard coating layer was prepared as follows. That is, 2.0 parts by weight of 0.5 N hydrochloric acid and 20 parts by weight of acetic acid were added to 240 parts by weight of a colloidal silica having an $SiO_2$ concentration of 40% (Snowtex-40, water-dispersed silica, supplied by Nissan Chemical Industry Co., Ltd.), and while the mixture was stirred at 35° C., 95 parts by weight of γ-glycidoxypropyltrimethoxysilane (trifunctional organosilicon compound) was dropwise added. The mixture was stirred at room temperature for 8 hours, and allowed to stand at room temperature for 16 hours. To the resultant hydrolysis solution were added 80 parts by weight of methyl cellosolve, 120 parts by weight of isopropyl alcohol, 40 parts by weight of butyl alcohol, 16 parts by weight of aluminum acetyl acetone, 0.2 part by weight of a silicone-based surfactant and 0.1 part by weight of an ultraviolet absorbent, and the mixture was stirred for 8 hours, and aged at room temperature for 24 hours to give a hard coating liquid.

The composition of the hard coating liquid had a silica content of 80 mol % (as an $SiO_2$ solid content) and a γ-glycidoxypropyltrimethoxysilane content of 20 mol %.

Then, the above hard coating liquid was applied to the above-obtained lenses by an immersing method at a take-up ratio of 15 cm/min., and the lenses were allowed to stand at room temperature for 15 minutes. Then, the coatings were cured under heat at 120° C. for 2 hours to form hard coating layers.

The above-obtained lenses with hard coatings were excellent in abrasion resistance, adhesion, appearance, heat resistance, weatherability and chemical resistance and satisfied the standard of ophthalmic lenses.

Comparative Example 1

Lenses were produced in the same manner as in Example 1 except that 30 parts by weight of L-7604 was replaced with 100 ppm by weight, based on DAC, of Zelec UN(mold releasing agent, supplied by E. I. du Pont de Nemours & Co.). Table 1 shows the composition of the molding material, and Table 2 shows the properties of the molding material and the lenses. As shown in Table 2, the obtained lenses had a problem in dyeability.

Comparative Example 2

Lenses were produced in the same manner as in Example 1 except that 30 parts by weight of L-7604 was replaced with 100 ppm by weight, based on DAC, of L-45 (silicon oil, supplied by Nippon Unicar). Table 1 shows the composition of the molding material, and Table 2 shows the properties of the molding material and the lenses. As shown in Table 2, the obtained lenses had a problem in dyeability.

Comparative Example 3

Lenses were produced in the same manner as in Example 1 except that L-7604 was not used. Table 1 shows the composition of the molding material, and Table 2 shows the properties of the molding material and the lenses. As shown in Table 2, the obtained lenses had a problem in dyeability.

Comparative Example 4

Lenses were produced in the same manner as in Example 1 except that L-7604 was not used and that the amount of diisopropyl peroxydicarbonate was changed to 1.5 parts by weight. Table 1 shows the composition of the molding material, and Table 2 shows the properties of the molding material and the lenses. As shown in Table 2, the obtained lenses were poor in physical properties although they had no problem in dyeability.

TABLE 1

Composition of molding material

| | Monomer/polymerization initiator/ultraviolet absorbent (part by weight) | Dyeing non-uniformity preventer Kind | (ppm by weight) |
|---|---|---|---|
| Ex. 1 | DAC/IPP/HOBP (100/3/0.03) | L-7604 | 30 |
| Ex. 2 | DAC/IPP/HOBP (100/3/0.03) | L-7602 | 50 |
| Ex. 3 | DAC/IPP/HOBP (100/3/0.03) | L-7604 L-7602 | 20 20 |
| Ex. 4 | DAC/MMA/IPP/HOBP (100/10/2.5/0.03) | L-7602 | 50 |
| Ex. 5 | DAC/DATP/IPP/HOBP (100/25/2.5/0.03) | FZ-2165 | 100 |
| Ex. 6 | DAC/IPP/HOBP (100/3/0.03) | Mold was treated with L-7602 solution | |
| CEx. 1 | DAC/IPP/HOBP (100/3/0.03) | Zelec UN | 100 |
| CEx. 2 | DAC/IPP/HOBP (100/3/0.03) | L-45 | 100 |
| CEx. 3 | DAC/IPP/HOBP (100/3/0.03) | — | — |
| CEx. 4 | DAC/IPP/HOBP (100/1.5/0.03) | — | — |

Notes to Table 1:
Ex. = Example, CEx. = Comparative Example
DAC: Diethylene glycol bisallylcarbonate
IPP: Diisopropyl perooxydicarbonate
HOBP: 2-Hydroxy-4-n-octoxybenzophenone
MMA: Methyl methacrylate
DATP: Diallyl terephthalate Notes to Table 1:

Ex.=Example, CEx.=Comparative Example
DAC: Diethylene glycol bisallylcarbonate
IPP: Diisopropyl perooxydicarbonate
HOBP: 2-Hydroxy-4-n-octoxybenzophenone
MMA: Methyl methacrylate
DATP: Diallyl terephthalate

TABLE 2

| | Evaluation of physical properties | | | |
|---|---|---|---|---|
| | Moldability | Transparency | Dyeability | Processability |
| Ex. 1 | ⊙ | ○ | ⊙ | ○ |
| Ex. 2 | ⊙ | ○ | ○ | ○ |
| Ex. 3 | ⊙ | ○ | ⊙ | ○ |
| Ex. 4 | ○ | ○ | ○ | ○ |
| Ex. 5 | ○ | Δ | ○ | ○ |
| Ex. 6 | ○ | Δ | ○ | ○ |
| CEx. 1 | ○ | ○ | X | ○ |
| CEx. 2 | Δ | ○ | X | ○ |
| CEx. 3 | ○ | ○ | X | ○ |
| CEx. 4 | ⊙ | ○ | ○ | X |

Notes to Table 2:
Ex. = Example, CEx. = Comparative Example
Evaluation methods:
(1) Moldability
Moldability was evaluated as follows on the basis of the percentage of lenses which were in intimate contact with a mold after the polymerization.
⊙ : At least 95%.
○ : At least 80% to less than 95%.
Δ : At least 65% to less than 80%.
X : Less than 65%
(2) Transparency
The obtained lenses were visually observed under a fluorescence lamp in a dark place, and evaluated as follows. A lens which was free of fogging and the deposition of an non-transparent substance was taken as ○, a lens which was not free of them was taken as X, and a lens which slightly had them was taken as Δ.
(3) Dyeability
Dyeing was carried out as described in Example 1, and dyeability was evaluated as follows on the basis of the percentage of lenses free of non-uniformity of dyeing.
⊙ : At least 95%
○ : At least 80% to less than 95%
Δ : At least 65 5 to less than 80%
X : Less than 65%
(4) Processability
Conventional edging processing was carried out, and those which permitted the processing were taken as ○, and those which did not permit the processing were take as X.

Notes to Table 2:

Ex.=Example, CEx.=Comparative Example

Evaluation methods:

(1) Moldability

Moldability was evaluated as follows on the basis of the percentage of lenses which were in intimate contact with a mold after the polymerization.

⊙: At least 95%.

○: At least 80% to less than 95%.

Δ: At least 65% to less than 80%

X: Less than 65%

(2) Transparency

The obtained lenses were visually observed under a fluorescence lamp in a dark place, and evaluated as follows. A lens which was free of fogging and the deposition of an non-transparent substance was taken as ○, a lens which was not free of them was taken as X, and a lens which slightly had them was taken as Δ.

(3) Dyeability

Dyeing was carried out as described in Example 1, and dyeability was evaluated as follows on the basis of the percentage of lenses free of non-uniformity of dyeing.

⊙: At least 95%
○: At least 80% to less than 95%
Δ: At least 65 5 to less than 80%
X: Less than 65%

(4) Processability

Conventional edging processing was carried out, and those which permitted the processing were taken as ○, and those which did not permit the processing were take as X.

According to the present invention, the occurrence of defective dyeing can be prevented when a lens is dyed, and plastic lenses having excellent lens properties can be produced at high yields.

What is claimed is:

1. A cast-molding material for a plastic lens, which contains, as essential components, a combination of (A) diethylene glycol bisallylcarbonate or a mixture of diethylene glycol bisallylcarbonate and a monomer copolymerizable therewith, with (B) an effective amount of from 0.1 to 10,000 ppm by weight, based on component (A), of a polyether-modified silicone compound.

2. The cast-molding material according to claim 1 wherein the polyether-modified silicone compound as component (B) has the formula (I),

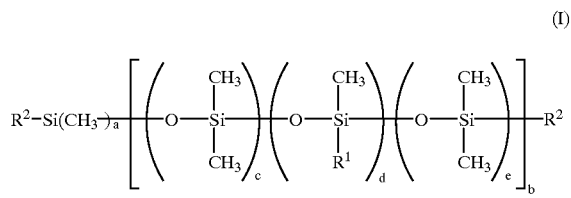

wherein:
 a is an integer of 0 to 2,
 b is an integer of 1 to 3,
 provided that a+b=3,
 each of c, d and e is an integer of 0 to 500,
 provided that c+d+e=an integer of 5 to 1,000,
 $R^1$ is —$(CH_2)_l(OC_2H_4)_m(OC_3H_6)_nOR^3$, and
 $R^2$ is methyl or —$(CH_2)_l(OC_2H_4)_m(OC_3H_6)_nOR^3$,
 in which $R^3$ is a hydrogen atom or a hydrocarbon group having 1 to 8 carbon atoms, and
 each of l, m and n is an integer of 0 to 500,
 provided that m+n=an integer of 1 to 1,000.

3. The cast-molding material according to claim 2, wherein the polyether-modified silicone compound of the formula (I) has a molecular weight of 200 to 100,000.

4. The cast-molding material according to claim 2, wherein a solution of 1% by weight of the polyether-modified silicone compound of the formula (I) in water has a surface tension of 10 to 50 dyn/cm.

5. The cast-molding material according to claim 3, wherein a solution of 1% by weight of the polyether-modified silicone compound of the formula (I) in water has a surface tension of 10 to 50 dyn/cm.

* * * * *